(12) United States Patent
Ohnishi et al.

(10) Patent No.: US 6,331,581 B1
(45) Date of Patent: Dec. 18, 2001

(54) METHOD FOR COLOR MATCHING OF POWDER COATING COMPOSITION AND PROCESS FOR THE PREPARATION THEREOF

(75) Inventors: Kazuhiko Ohnishi, Yokohama; Hidefumi Takanashi; Yugen Kawamoto, both of Hiratsuka, all of (JP)

(73) Assignee: Kansai Paint Co., Ltd., Hyogo-Ken (JP)

( * ) Notice: Subject to any disclaimer, the term of this patent is extended or adjusted under 35 U.S.C. 154(b) by 0 days.

(21) Appl. No.: 09/469,228

(22) Filed: Dec. 22, 1999

(30) Foreign Application Priority Data

Dec. 24, 1998 (JP) .................................................. 10-365899

(51) Int. Cl.⁷ ............................... C08J 3/12; C08K 5/01; C08K 5/053
(52) U.S. Cl. .......................... 523/221; 523/340; 523/351; 524/386; 524/487; 524/904; 525/934
(58) Field of Search .................................... 523/351, 340, 523/221; 524/904, 386, 487; 525/934

(56) References Cited

U.S. PATENT DOCUMENTS 4,614,674 * 9/1986 Lauterbauch .

FOREIGN PATENT DOCUMENTS

90/06345 * 6/1990 (WO) .

\* cited by examiner

*Primary Examiner*—Tae H. Yoon
(74) *Attorney, Agent, or Firm*—Armstrong, Westerman, Hattori, McLeland & Naughton, LLP

(57) ABSTRACT

This invention provides a method for color matching of a thermosetting powder coating composition, the method comprising the steps of: dryblending two or more kinds of starting colored thermosetting powder coating compositions of different colors having an average particle size of 10 $\mu$m or less to achieve color matching, and granulating the dryblend to a particle size in the range which is suitable for coating, by adding at least one binder selected from the group consisting of an aqueous solution of polyethylene glycol and an aqueous dispersion of paraffin wax; and a production process therefor. According to the present invention, color matching can be easily made, and a film of the obtained color-matched powder coating composition is excellent in finished appearance and outstanding in properties.

11 Claims, No Drawings

METHOD FOR COLOR MATCHING OF POWDER COATING COMPOSITION AND PROCESS FOR THE PREPARATION THEREOF

The present invention relates to a novel method for color matching of a thermosetting powder coating composition, the method being capable of color matching with ease, and to a process for the preparation thereof.

Conventionally the color matching of powder coating compositions have been made as by the following method to realize the color specified by the user. For example, a coloring pigment is mixed with and dispersed in a powder resin, a curing agent and the like, and the obtained dispersion is mixed to melt and disperse the coloring pigment, the curing agent and the like in the powder resin using, e.g. a twin-screw dispersing device, followed by cooling, coarse grinding, fine grinding and sieving, thereby giving the contemplated color-matched powder coating composition.

The above-mentioned preparation of color-matched powder coating compositions poses no problem in preparing a large amount of powder coating composition with a specified color. However, when powder coating compositions of various colors are prepared in small amounts, namely, in the case of small-lot manufacture of paints with different colors, numerous problems are entailed which include a great loss of powder coating compositions, considerable labor, intensified contamination and so on.

In order to overcome the above-mentioned problems, a variety of methods for color matching of powder coating compositions have been proposed. For instance, WO90/06345 discloses a method wherein two or more kinds of powder coating compositions with different colors are mixed together and granulated with an aqueous acrylic resin as a granulating agent to provide a color-matched powder coating composition. Japanese Unexamined Patent Publication No. 188586/1995 describes a method wherein two or more kinds of powder coating compositions are dryblended for color matching, and the dryblend is granulated with a synthetic resin as a binder. However, these conventional methods raise the problem that the methods necessitate the use of an aqueous acrylic resin and a resin binder both having a high molecular weight to prevent the degradation of film properties, resulting in irregular granules due to a high viscosity of the resin component and a decrease in thermal flowability of granulated powder coating composition and leading to the impairment of film properties such as smoothness of coating surface, specular reflectance and the like.

An object of the present invention is to provide a method for color matching of a powder coating composition and a production process, the method or process being capable of giving a powder coating composition which forms a film improved in finished appearance without flooding and excellent in properties such as smoothness of coating surface, specular reflectance, adhesion and the like, and the method or process being capable of facilitating color matching and small-lot manufacture of powder coating compositions with different colors.

Other objects and features of this invention will become apparent from the following description.

According to the present invention, there is provided a method for color matching of a thermosetting powder coating composition, the method comprising the steps of: dryblending two or more kinds of starting colored thermosetting powder coating compositions of different colors having an average particle size of 10 $\mu$m or less to achieve color matching, and granulating the dryblend to a particle size in the range which is suitable for coating, by adding at least one binder selected from the group consisting of an aqueous solution of polyethylene glycol and an aqueous dispersion of paraffin wax.

According to the present invention, there is also provided a process for preparing a color-matched thermosetting powder coating composition, the process including the above-mentioned color matching step and granulation step.

The present inventors conducted extensive research to overcome the foregoing problems of the prior art and found the following solution. The solution is a method comprising dryblending two or more kinds of starting thermosetting powder coating compositions of different colors with a specific particle size to accomplish color match, and granulating the dryblend by adding a specific binder. The method makes it easy to match the color of coating compositions and produces a colored thermosetting powder coating composition excellent in finished appearance and film properties. The present invention was accomplished based on these novel findings.

Starting Colored Thermosetting Powder Coating Composition

Colored thermosetting powder coating compositions for use as the starting materials in the color matching method and the production process of the present invention comprise a coloring pigment and a resin component comprising a curing agent and a thermosetting powder resin which is melted and fluidized when heated. The thermosetting powder resin has a softening temperature of about 30 to about 100° C.

The coloring pigment to be used herein is at least one pigment selected from white pigments, black pigments, red pigments, yellow pigments, blue pigments, green pigments, scaly aluminum powders, colored mica powders, copper powders, tin powders, and stainless steel powders. The amount of the coloring pigment to be used can be suitably selected to impart satisfactory film properties such as hiding power and surface smoothness to the film formed from the obtained powder coating composition. Although variable with the type of the pigment used, the amount of the pigment is about 0.1 to about 100 parts by weight, preferably about 1 to about 80 parts by weight, per 100 parts by weight of the powder resin component.

Examples of said thermosetting powder resins include resins having a functional group which reacts with a curing agent when heated. Specific examples of such resins are acrylic resins, polyester resins, epoxy resins, fluorine-containing resins, silicone resins and hybrids of these resins. Suitable functional groups include hydroxyl, carboxyl, epoxy, blocked isocyanate, etc.

The curing agent which is useful herein includes one having a functional group which reacts with the functional group in the powder resin to form a cured coating film or one capable of initiating polymerization of the functional group in the powder resin. Examples of curing agents for hydroxyl-containing powder resins include amino resins and blocked isocyanate compounds. Examples of curing agents for carboxyl-containing powder resins include polyepoxides and B-hydroxyethyl alkylamides. Examples of curing agents for epoxy-containing powder resins include polycarboxylic acids, initiators for cationic polymerization of epoxy groups, etc. Examples of curing agents for blocked isocyanate-containing powder resins include polyols.

Examples of amino resins include hexamethoxymelamine resins, hexaethoxymelamine resins, "Cymel 303" (tradename, a product of Mitsui Cytec. Co., Ltd.) and "Sumimal M-55" (tradename, a product of Sumitomo Chemical Co., Ltd.). Examples of blocked isocyanate compounds include those prepared by blocking an aliphatic, alicyclic or aromatic polyisocyanate with a blocking agent such as a phenol, ε-caprolactam or alcohol. The aliphatic, alicyclic or aromatic polyisocyanate may be isophorone diisocyanate, hexamethylene diisocyanate, xylylene diisocyanate, tolylene diisocyanate, hydrogenated xylylene diisocyanate, hydrogenated tolylene diusocyanate or the like. Examples of polyepoxides include homopolymers and copolymers of triglycidyl isocyanurate or glycidyl (meth) acrylate, and "Celoxide 2021" (tradename) and "EHPE-3150" (tradename) both manufactured by Daicel Industries, Co., Ltd. Examples of β-hydroxyethyl alkylamides include β-hydroxyethyl propylamide. Examples of polycarboxylic acids include adipic acid, sebacic acid, suberic acid, succinic acid, glutaric acid, maleic acid, fumaric acid, dodecanedioic acid, pimelic acid, azelaic acid, itaconic acid, citraconic acid and like aliphatic polycarboxylic acids and their anhydrides; terephthalic acid, isophthalic acid, phthalic acid, trimellitic acid, pyromellitic acid and like aromatic polycarboxylic acids and their anhydrides; and hexahydrophthalic acid, hexahydroisophthalic acid, methylhexahydro-phthalic acid and like alicyclic polycarboxylic acids and their anhydrides. Examples of polyols include trimethylolpropane, sorbitol and tris(2-hydroxyethyl)isocyanurate. Examples of initiators for cationic polymerization of epoxy groups include benzyl-4-hydroxyphenyl methylsulfonium hexafluoroantimonate and benzyl-4-hydroxyphenyl methylsulfonium hexafluorophosphate.

The starting colored thermosetting powder coating composition may contain, in addition to the powder resin, the curing agent and the coloring pigment, curing catalysts, fillers, UV stabilizers, UV absorbers, fluidity modifiers, anti-cissing agents, oil repellents, antibacterial agents, rust preventives, etc., where necessary. Useful UV absorbers include, for example, benzotriazole compounds.

The starting powder coating composition can be prepared by conventional methods such as the melting and kneading method and lyophilizing method. The melting and kneading method comprises dryblending a powder resin, a curing agent, a coloring pigment and optionally other components in a mixer or the like, and melting and kneading the dryblend with heating, followed by cooling, coarse grinding, fine grinding and sieving. The lyophilizing method comprises dissolving or dispersing a powder resin, a curing agent, a coloring pigment and optionally other components in an organic solvent having a melting point of −40° C. or above, freezing the solution or dispersion usually at 10 to −40° C., and removing the solvent under reduced pressure for drying. Useful organic solvents include tert-butanol and dioxane.

According to the present invention, the starting powder coating composition has an average particle size of 10 μm or less, preferably 1 to 10 μm, more preferably 1 to 8 μm. If the average particle size exceeds 10 μm, the obtained granulated powder coating composition is given a large average particle size, thereby reducing the electrostatic coating workability and degrading the surface smoothness and the flooding resistance of the film.

In the present invention, the average particle size of the starting powder coating composition and granulated powder coating composition is defined as the particle size with a cumulative frequency of 50%, as calculated from the results of particle size distribution analysis. The particle size distribution is analyzed using, e.g. "Microtrac" (tradename for an FRA particle size analyzer manufactured by Nikkiso K.K.).

Color Matching Step

In the present method or process, first the color matching is conducted by dryblending two or more kinds of starting colored thermosetting powder coating compositions of different colors having an average particle size of 10 μm or less.

The color matching step is executed, for example, by dryblending two or more kinds of powder coating compositions of different colors by a high-speed mixer or the like to give a uniform mixture and inspecting the color of the mixture, whereby a blend of the desired color is obtained.

There is no limitation on the temperature and time involved in dryblending. Usually it is suitable to carry out the dryblending at about 5 to about 40° C., preferably about 8 to about 30° C. for about 0.5 minute to about 24 hours, preferably about 1 minute to about 1 hour. Further, for example, in the case of using a high-speed mixer, the mixture is agitated by an agitator revolving at about 100 to about 5,000 rpm., preferably about 200 and about 2,000 rpm. and a chopper revolving at about 1,000 to about 10,000 rpm., preferably about 2,000 to about 6,000 rpm.

Optionally, when a relationship between the mixing ratio of two or more kinds of starting powder coating compositions and the color of the resulting film is previously input into a computer, the mixing ratio of two or more kinds of powder coating compositions which gives a film of the desired color can be automatically determined. In other words, the color matching step can be automated and can be more conveniently conducted by utilizing a computerized color matching method.

Granulation Step

In the present method or process, the above-obtained dryblend of powder coating compositions having the desired color given in the color matching step is granulated to a particle size in the range which is suitable for coating, by adding at least one binder selected from the group consisting of an aqueous solution of polyethylene glycol and an aqueous dispersion of paraffin wax, whereby the contemplated color-matched thermosetting powder coating composition is obtained.

The aqueous solution of polyethylene glycol to be used as the binder in the granulation step has a solids content of preferably about 1 to about 50% by weight, more preferably about 10 to about 20% by weight. The amount of the aqueous solution of polyethylene glycol to be used is preferably about 0.01 to about 5 parts by weight, more preferably about 0.1 to about 3 parts by weight, per 100 parts by weight of the dryblend of powder coating compositions, all calculated as solids. If the amount of the aqueous solution of polyethylene glycol is less than about 0.01 part by weight, the granulation becomes insufficient and flooding is likely to occur. On the other hand, the amount exceeding 5 parts by weight tends to reduce the blocking resistance of the coating composition and is apt to impair the film properties such as water resistance. Hence, the use of the solution outside said range is undesirable. The term "blocking resistance" used herein refers to a property of preventing the particles of the powder coating composition from fusing to each other and forming a great mass (blocking). The use of polyethylene glycol as an aqueous solution increases the uniform dispersibility of the powder coating composition in the granulation step.

The polyethylene glycol used herein has a melting point of preferably 50° C. or more, more preferably 50 to 65° C. The melting point of less than 50° C. reduces the blocking resistance of the coating composition, whereas the melting point of more than 65° C. impairs the finished appearance of the film. Hence, the use of polyethylene glycol with a melting point outside said range is undesirable. The polyethylene glycol used herein has a molecular weight of preferably 1,000 to 30,000, more preferably 2,000 to 20,000. The molecular weight of less than 1,000 reduces the blocking resistance of the coating composition, whereas the molecular weight of more than 30,000 deteriorates the finished appearance of the film. Hence, the use of polyethylene glycol with a molecular weight outside said range is undesirable. Examples of the polyethylene glycol which is usable herein are polyethylene glycol #3000 (m.p.55–58° C.), polyethylene glycol #4000 (m.p.54–58° C.), polyethylene glycol #6000 (m.p.56–63° C.), polyethylene glycol 10000 (m.p. 58–63° C.), polyethylene glycol 15000 (m.p.58–63° C.), polyethylene glycol 20000 (m.p.58–63° C.), etc.

The aqueous dispersion of paraffin wax to be used as the binder in the granulation step has a solids content of preferably about 1 to about 50% by weight, more preferably about 10 to about 20% by weight. The amount of the aqueous dispersion of paraffin wax to be used is preferably about 0.01 to about 5 parts by weight, more preferably about 0.1 to about 3 parts by weight, per 100 parts by weight of the dryblend of powder coating compositions, all calculated as solids. If the amount of the aqueous dispersion of paraffin wax is less than about 0.01 part by weight, the granulation becomes insufficient and flooding is likely to occur. On the other hand, the amount exceeding 5 parts by weight tends to degrade the gloss of the film. Hence, the use of the dispersion outside said range is undesirable.

The aqueous dispersion of paraffin wax contains the particles of paraffin wax having an average particle size of preferably about 5 $\mu$m or less, more preferably about 0.01 to about 3 $\mu$m. The paraffin wax used herein has a melting point of preferably about 20 to abut 100° C., more preferably about 30 to about 80° C.

The aqueous solution of polyethylene glycol and the aqueous dispersion of paraffin wax are used either alone or in mixture. When they are used in mixture, the amount of the mixture to be used is preferably about 0.01 to about 5 parts by weight, more preferably about 0.1 to about 3 parts by weight, per 100 parts by weight of the dryblend of powder coating compositions, all calculated as solids.

Water to be used in the aqueous solution of polyethylene glycol and the aqueous dispersion of paraffin wax may be partly (50% by weight or less) replaced by an aqueous organic solvent having a boiling point of about 150° C. or less which is incapable of dissolving the powder coating composition. Useful organic solvents include, for it example, methanol, ethanol, propanol, etc.

The granulation step of the present process is carried out by adding with agitating, to the dryblend obtained in the color matching step, at least one binder selected from the group consisting of an aqueous solution of polyethylene glycol and an aqueous dispersion of paraffin wax, so as to granulate the dryblend to a particle size in the range which is suitable for coating and usually drying the granules to remove the water.

The binder can be added, for example, dropwise or by spraying, and the granules can be dried, for example, under reduced pressure.

In the granulation step, it is necessary to take care lest the powder coating composition to be granulated should have a temperature higher than the fusing temperature thereof. The temperature conditions for granulation and drying under reduced pressure vary with the melting point, softening temperature and melting viscosity of the binder and the starting coating compositions used and the production amount and other factors so that suitable conditions are selected according to the starting powder coating compositions used and other factors. Generally, the granulation and drying are conducted at a temperature of about 10 to about 80° C., preferably about 30 to about 50° C. for about 1 minute to about 20 hours, preferably about 5 minutes to about 10 hours.

The color-matched granulated coating composition prepared by the process of the present invention has an average particle size larger by about 1 to about 50 $\mu$m, preferably about 2 to about 40 $\mu$m than the dryblend of non-granulated powder coating compositions. Generally the granulated powder coating composition has an average particle size of about 11 to about 60 $\mu$m, preferably about 12 to about 50 $\mu$m. If the average particle size is below the range, a coating tends to deposit with a lower efficiency when applied by electrostatic coating operation, whereas above the range, a coating tends to be given a lower surface smoothness. Namely, the average particle size outside the foregoing range is undesirable.

The color-matched powder coating composition obtained by the present process is applied to a substrate to be coated and is baked to form a cured coating film.

Substrates to be coated can be any of conventional substrates which are used in powder coating. Examples of useful substrates include metals, surface-treated metals, plastics, these substrates coated with a coating composition, etc. The powder coating operation can be carried out by conventional methods, for example, desirably electrostatic powder coating method, frictionally electrified powder coating method, fluidization dip coating method, etc. There is no limitation on the film thickness. However, it is suitable that the obtained film has a cured thickness of about 20 to about 200 $\mu$m, preferably about 20 to about 150 $\mu$m, more preferably about 20 to about 80 $\mu$m. The deposited composition is baked at a temperature of about 100 to about 250° C., preferably about 160 to about 200° C. for about 3 to about 120 minutes, preferably about 20 to about 40 minutes.

The color-matched powder coating composition obtained by the present process can be used, without limitation, in applications in which conventional powder coating compositions are used, such as automobiles, electric appliances, furniture made of steel, office goods, construction materials, pipes, etc.

The present invention will be described in detail with reference to the following examples and comparative examples in which the parts and the percentages are all by weight. However, the present invention is not limited at all to these examples.

The starting powder coating compositions used in the examples and comparative examples are as follows:

(1) "Everclad #4800 White": tradename for a product of Kansai Paint Co., Ltd. with an average particle size of about 5 $\mu$m, blocked isocyanate-curable polyester resin powder coating composition giving a white coating film with a lightness value L* of about 95 in L*a*b* color specification (JIS Z 8729);

(2) "Everclad #4800 Gray": tradename for a product of Kansai Paint Co., Ltd. with an average particle size of about 5 $\mu$m, blocked isocyanate-curable polyester resin powder coating composition giving a gray coating film with a lightness L* of about 70 in L*a*b* color specification (JIS Z 8729); and (3) "Everclad #4800 Yellow": tradename for a product of Kansai Paint Co., Ltd. with an average particle size of about 5 $\mu$m, blocked isocyanate-curable polyester resin powder coating composition giving a yellow coating film with a lightness L* of about 84 in L*a*b* color specification (JIS Z 8729).

EXAMPLE 1

A high-speed mixer (product of Fukae Kogyo K.K., 2 liter volume) was charged with 100 g of Everclad #4800 White and, 100 g of Everclad #4800 Gray. The mixture was dryblended with agitating for 1 minute using an agitator (600 rpm.) and a chopper (4,000 rpm.). An aqueous solution of polyethylene glycol #4000 (a melting point of 54 to 58° C. and a molecular weight of 2,700 to 3,400) was sprayed as a binder in an amount of 1.5 parts (per 100 parts by weight of the powder coating compositions, all calculated as solids) over a period of 10 minutes. Then agitation was continued for 10 minutes under the same agitation conditions to granulate the mixture. The granules were dried by agitation for 30 minutes under reduced pressure using an agitator (100 rpm.) and a chopper (500 rpm.), giving a color-matched powder coating composition. The dryblending and the granulation were carried out at a temperature 25° C. and the obtained granules were dried at 40° C. under reduced pressure.

EXAMPLE 2

The same procedure as in Example 1 was repeated with the exception of using polyethylene glycol #6000 (mp. 56–63° C., molecular weight 7,400–9,000) in place of polyethylene glycol #4000 in the same amount, giving a color-matched powder coating composition.

EXAMPLE 3

The same procedure as in Example 1 was repeated with the exception of using polyethylene glycol 10000 (mp. 58–63° C., molecular weight 9,000–12,500) in place of polyethylene glycol #4000 in the same amount, giving a color-matched powder coating composition.

EXAMPLE 4

The same procedure as in Example 1 was repeated with the exception of using polyethylene glycol 20000 (mp. 58–63° C., molecular weight 20,000) in place of polyethylene glycol #4000 in the same amount, giving a color-matched powder coating composition.

EXAMPLE 5

The same procedure as in Example 1 was repeated with the exception of using "Flowlen ALX-3082" (tradename for paraffin wax manufactured by Kyoeisha Kagaku Co., Ltd., mp. 62° C., average particle size 0.54 $\mu$m, 70% aqueous dispersion [used as diluted with water to 35% aqueous dispersion]) in place of polyethylene glycol #4000 in the same amount (calculated as solids), giving a color-matched powder coating composition.

EXAMPLE 6

The same procedure as in Example 1 was repeated with the exception of using "Everclad #4800 Yellow" in place of "Everclad #4800 Gray" in the same amount, giving a color-matched powder coating composition.

COMPARATIVE EXAMPLE 1

A color-matched powder coating composition was produced in the same manner as in Example 1 with the exception of not using the binder.

COMPARATIVE EXAMPLE 2

A color-matched powder coating composition was produced in the same manner as in Example 1 with the exception of using polyethylene glycol #4000 in an amount of 6 parts per 100 parts of the dryblended powder coating compositions, calculated as solids.

COMPARATIVE EXAMPLE 3

A color-matched powder coating composition was produced in the same manner as in Example 1 with the exception of using polyethylene glycol #600 (mp.35–40° C., molecular weight about 600) in place of polyethylene glycol #4000 in the same amount.

COMPARATIVE EXAMPLE 4

A color-matched powder coating composition was produced in the same manner as in Example 1 with the exception of using an emulsion of oxidized polyethylene wax (solids content 40%, mp.30–40° C., molecular weight about 600) in place of polyethylene glycol #4000 in the same amount (calculated as solids).

COMPARATIVE EXAMPLE 5

A color-matched powder coating composition was produced in the same manner as in Example 6 with the exception of not using the binder.

The properties and film properties of the powder coating compositions prepared in the Examples and Comparative Examples were evaluated by the following methods.
Properties of Coating Composition
  Repose Angle
  The powder coating composition was made to flow onto a circular table and then an angle of the ridgeline of a heap to a horizontal line was determined using "Powder Tester" (tradename, a product of Hosokawamicron Co., Ltd.). The smaller the angle, the higher the flowability.
  Bulk density (g/cm$^3$): The apparent density of the powder coating composition was determined according to JIS K 5101 20. The higher the bulk density, the higher the flowability of the powder coating composition. Blocking resistance: After a 7-day storage of the powder coating composition at 40° C., the blocking resistance thereof was evaluated according to the following criteria. A, the particles of powder coating composition have not fused at all, showing a high blocking resistance; B, the particles of powder coating composition have fused but have separated with fingers; and C, the particles of powder coating composition have fused and have not separated with fingers, showing a low blocking resistance. Average particle size ($\mu$m): The particle size distribution was measured using "Microtrac" (tradename for an FRA particle size analyzer manufactured by Nikkiso K.K.). The average particle size of the powder coating composition was expressed in terms of particle size ($\mu$m) with a cumulative frequency of 50%.
Test for Film Properties
  Production of a substrate to be coated: The coating composition was applied to a zinc phosphate-treated steel plate by an electrostatic coating operation to provide a coating film with a thickness of 60 $\mu$m when baked. The coating film was baked at 180° C. for 30 minutes. The thus coated plate was used In the following tests.
  Surface smoothness: The surface of the coating film was visually inspected to evaluate the surface smoothness of the film according to the following criteria. A, substantially no change such as shrinkage occurred; B, a change such as shrinkage occurred; and C, a marked change such as shrinkage occurred.
  Specular reflectance: A specular reflectance (%) at an angle of 60° C. was measured according to JIS K 5400.
  Flooding resistance: The surface of the coating film was visually inspected to evaluate the resistance to flooding according to the following criteria. A, no flooding existed; B, slight flooding existed; and C, marked flooding existed.

Erichsen value: A breaking distance was determined according to JIS K 5400 8.2 by forcing a steel ball into the coating film until rupture or peel occurs in the film. The breaking distance was expressed as an Erichsen value which is an index indicative of the adhesion of the film. The greater the Erichsen value, the higher the adhesion. Lightness of the film The lightness of the film was expressed in a lightness value L* in L*a*b* color specification (JIS Z 8729).

Table 1 shows the results of testing the powder coating compositions for their properties and film properties.

TABLE 1

|  | Example | | | | | |
| --- | --- | --- | --- | --- | --- | --- |
|  | 1 | 2 | 3 | 4 | 5 | 6 |
| Properties of coating Composition | | | | | | |
| Repose angle (°) | 42 | 41 | 40 | 40 | 39 | 40 |
| Bulk density (g/cm$^3$) | 0.55 | 0.53 | 0.52 | 0.51 | 0.50 | 0.53 |
| Blocking resistance | A | A | A | A | A | A |
| Average particle size (μm) | 45 | 45 | 45 | 47 | 40 | 44 |
| Film properties | | | | | | |
| Surface smoothness | A | A | A | A | A | A |
| Specular reflectance (%) | 90 | 91 | 91 | 91 | 91 | 91 |
| Flooding resistance | A | A | A | A | A | A |
| Erichsen value (mm) | 7< | 7< | 7< | 7< | 7< | 7< |
| Lightness (L*) | 85 | 84 | 84 | 84 | 84 | 91 |

|  | Comparative Example | | | | |
| --- | --- | --- | --- | --- | --- |
|  | 1 | 2 | 3 | 4 | 5 |
| Properties of coating Composition | | | | | |
| Repose angle (°) | 65 | 40 | 70 | 41 | 64 |
| Bulk density (g/cm$^3$) | 0.38 | 0.49 | 0.55 | 0.50 | 0.39 |
| Blocking resistance | A | B | A | A | A |
| Average particle size (μm) | 5 | 25 | 40 | 10 | 5 |
| Film properties | | | | | |
| Surface smoothness | A | A | C | B | A |
| Specular reflectance (%) | 90 | 86 | 78 | 81 | 90 |
| Flooding resistance | C | B | A | C | C |
| Erichsen value (mm) | 7< | 6 | 7< | 6 | 7< |
| Lightness (L*) | 77 | 74 | 60 | 70 | 86 |

According to the present invention, the following remarkable results can be achieved: color matching can be easily made; small lots of powder coating compositions of different colors can be easily manufactured; and a film of the obtained color-matched powder coating composition is excellent in finished appearance without flooding and outstanding in surface smoothness, specular reflectance, adhesion and like film properties.

What is claimed:

1. A method for color matching a thermosetting powder coating composition, the method comprising the steps of: dryblending two or more starting colored thermosetting powder coating compositions of different colors having an average particle size of 10 μm or less to achieve color matching; granulating the dryblend to a particle size in the range which is suitable for coating, by adding at least one binder selected from the group consisting of an aqueous solution of polyethylene glycol and an aqueous dispersion of paraffin wax; and drying the granules to remove the water.

2. The method according to claim 1, wherein the aqueous solution of polyethylene glycol has a solids content of about 1 to about 50% by weight.

3. The method according to claim 1, wherein the amount of the aqueous solution of polyethylene glycol to be used is about 0.01 to about 5 parts by weight per 100 parts by weight of the dryblend of powder coating compositions.

4. The method according to claim 1, wherein the polyethylene glycol has a melting point of 50° C. or more.

5. The method according to claim 1, wherein the polyethylene glycol has a molecular weight of 1,000 to 30,000.

6. The method according to claim 1, wherein the aqueous dispersion of paraffin wax has a solids content of about 1 to about 50% by weight.

7. The method according to claim 1, wherein the amount of the aqueous dispersion of paraffin wax to be used is about 0.01 to about 5 parts by weight per 100 parts by weight of the dryblend of powder coating compositions.

8. The method according to claim 1, wherein the paraffin wax dispersed in the aqueous dispersion has an average particle size of about 5 μm or less.

9. The method according to claim 1, wherein the paraffin wax has a melting point of about 20 to about 100° C.

10. The method according to claim 1, wherein the granulated color-matched powder coating composition has an average particle size of about 11 to about 60 μm.

11. A process for preparing a color-matched theromosetting powder coating composition, the process comprising the steps of: dryblending two or more starting colored thermosetting powder coating compositions of different colors having an average particle size of 10 μm or less to achieve color matching; granulating the dryblend to a particle size in the range which is suitable for coating, by adding at least one binder selected from the group consisting of an aqueous solution of polyethylene glycol and an aqueous dispersion of paraffin wax; and drying the granules to remove the water.

* * * * *